(12) United States Patent
Keller

(10) Patent No.: US 8,189,316 B2
(45) Date of Patent: May 29, 2012

(54) HYDRAULIC VALVE CONTROL CIRCUIT AND METHOD FOR CHECKING THE FUNCTION OF A HYDRAULIC VALVE CONTROL CIRCUIT

(75) Inventor: Dieter Keller, Veitshoechheim (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 12/436,250

(22) Filed: May 6, 2009

(65) Prior Publication Data

US 2009/0279222 A1    Nov. 12, 2009

(30) Foreign Application Priority Data

May 9, 2008    (DE) .......................... 10 2008 023 157

(51) Int. Cl.
*H01H 9/00*    (2006.01)
(52) U.S. Cl. ....................................... 361/139; 361/160
(58) Field of Classification Search .................. 361/139, 361/144, 160
See application file for complete search history.

(56) References Cited

U.S. PATENT DOCUMENTS 5,164,874 A * 11/1992 Okano et al. .................... 361/56
5,648,759 A *  7/1997 Miller et al. .................. 340/660

OTHER PUBLICATIONS

RE 95200/11.07 BODAS Controller RC Series 20. For closed- and open-loop control of hydraulic components. Bosch Rexroth AG. Elchingen, Germany (2007).

* cited by examiner

*Primary Examiner* — Danny Nguyen
(74) *Attorney, Agent, or Firm* — Leydig, Voit & Mayer, Ltd.

(57) ABSTRACT

A hydraulic valve control circuit of a hydraulic valve comprises an external voltage supply, an output stage having a voltage supply input and at least one output configured to actuate an actuator of the hydraulic valve, an overcurrent protective device disposed in a path between the external voltage supply and the voltage supply input, an enable input configured to activate and deactivate the output stage, and a switch configured to connect the at least one output to a fixed potential when the output stage is deactivated.

12 Claims, 1 Drawing Sheet

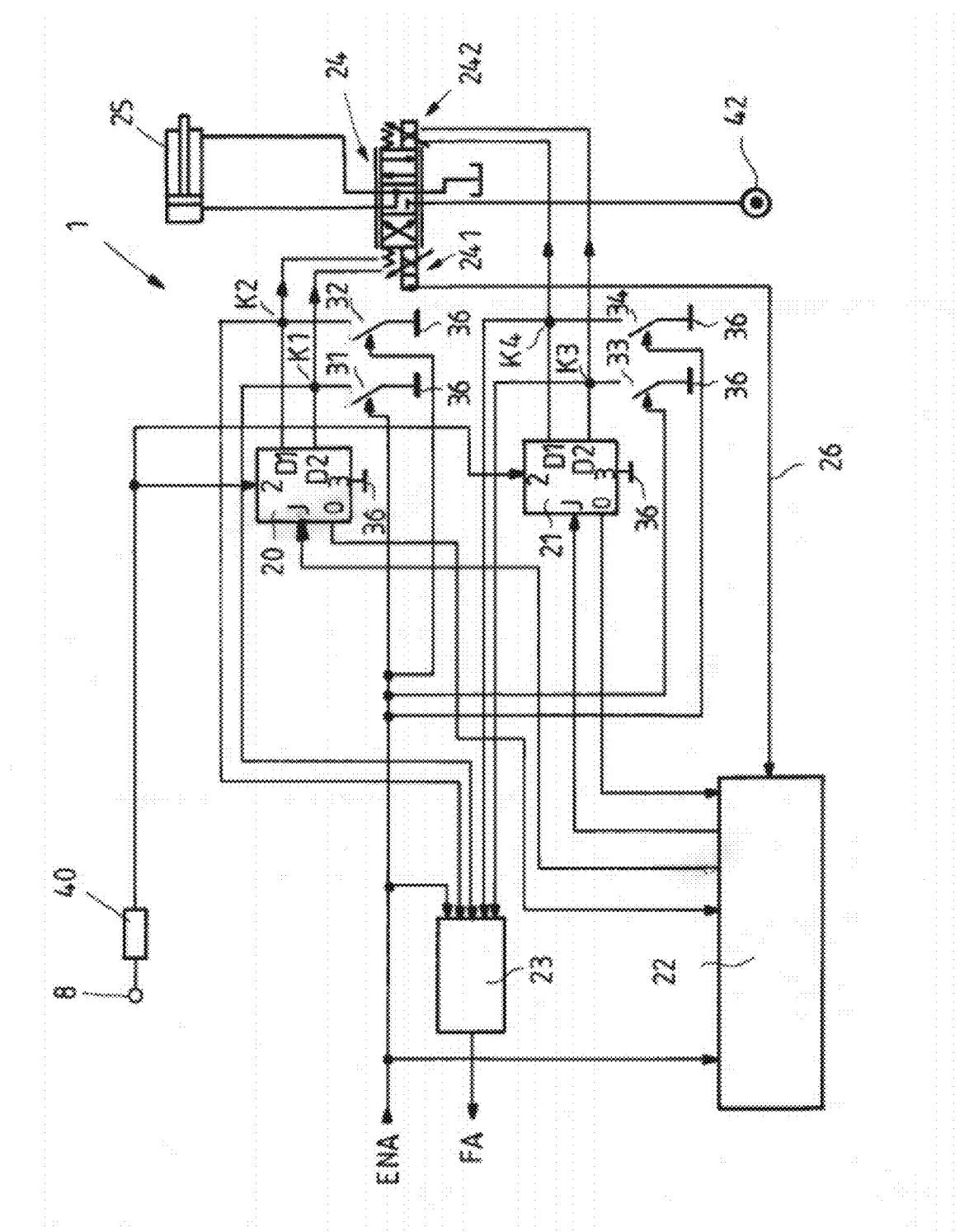

HYDRAULIC VALVE CONTROL CIRCUIT AND METHOD FOR CHECKING THE FUNCTION OF A HYDRAULIC VALVE CONTROL CIRCUIT

Priority is claimed to German Patent Application No. DE 10 2008 023 157.6, filed on May 9, 2008, the entire disclosure of which is incorporated by reference herein.

The invention relates to a hydraulic valve control circuit and to a method for checking the function of a hydraulic valve control circuit.

BACKGROUND

When it comes to hydraulic valves, especially hydraulic valves used in driven machines, safety precautions have to be taken so that the hydraulic valves do not trigger movements that pose a hazard to their environment. For this reason, particularly in the case of hydraulic valves that have solenoids to move a control spool, care is taken to ensure that the solenoids cannot be inadvertently energized.

The solenoids are driven by output stages that are powered by a voltage supply. In addition to the switch-off function of the output stages, which switch their outputs high-ohmically during the switching-off, as a safety measure, it should be possible to disconnect the output stage from the supply voltage by means of a switch.

Data sheet RD 95200 of the Bosch Rexroth company dated June 2007 shows a control device for a hydraulic valve having a central safety shutdown. Here, however, the problem arises that the components employed for the safety shutdown are likewise subjected to ageing processes, and a failure of the central safety shutdown can give rise to undesired reactions in the system that is actuated by the hydraulic valve.

SUMMARY OF THE INVENTION

An aspect of the present invention is to provide a hydraulic valve control circuit in which a higher level of safety can be ensured during the switching-off of the output stages of the hydraulic valve and a method for checking the function of such a hydraulic valve control circuit.

According to the invention, a hydraulic valve control circuit is provided that has an output stage comprising a first voltage supply input and a second voltage supply input as well as an output to actuate an actuator of a hydraulic valve. Moreover, the hydraulic valve control device has an enable input to activate and deactivate the output stage.

A switch is provided in order to connect the output of the output stage to a fixed potential when the output stage is deactivated. Moreover, an overcurrent protective device is provided in the path between an external voltage supply and the first voltage supply input of the output stage. The switch and the overcurrent protective device improve the safety during the operation of the hydraulic valve control circuit.

When the output stage is deactivated, it is ensured that the output is connected to a fixed potential so that no more current can flow through the actuator. If the output stage has not been deactivated, a short-circuit path is created between the external voltage supply and the fixed potential. The overcurrent protective device can respond in that it interrupts the current path.

In this manner, it is ensured that, if the output stage is defective, it can be disconnected from the external voltage supply. If the deactivation has not taken place, the hydraulic valve is prevented from continuing to move its control spool, thus causing movements of the device actuated by the hydraulic system, which would pose a risk for its environment.

The cutout makes the control circuit safer. This eliminates the need for additional measures with which the output stage can be disconnected from the voltage supply source. It is sufficient to eliminate the enabling of the valve. The disconnection of the supply voltage via an external safety relay or by a contactor can be limited to the emergency-OFF case. The switching-off of the output stage can thus take place via a single enable input which reduces the risk of erroneous actuations of the hydraulic valve control circuit.

In one embodiment, the overcurrent protective device has a fusible cutout. Such a cutout melts if the current passing through the cutout is too high. The connection can be reestablished by replacing the cutout. A fusible cutout is less susceptible to malfunction since only the magnitude of the current is decisive as to whether the cutout melts or not.

In another embodiment, the overcurrent protective device has a circuit breaker. Such a circuit breaker opens a switch if the current passing through the switch is too high. Such a switch can be used multiple times.

The potential at the output of the output stage can be checked by means of a measuring circuit that serves to measure the voltage. If this potential differs from an expected value, this means that the output stage has not switched its output high-ohmically and is thus defective.

If the measuring circuit measures a potential at the output that differs from the fixed potential by more than a prescribed threshold value, then this is output at an error output in order to indicate an error. At this error output, the fact that the hydraulic valve control circuit is defective is indicated to a superordinated system. In addition, a light diode can be provided that also visually indicates this to a user.

A second measuring circuit to measure the potential at the first voltage supply input of the output stage can check whether the overcurrent protective device has disconnected the output stage from the external voltage supply in order to likewise indicate this to a superordinated system.

If the fixed potential is selected to be the same as the potential at the second voltage supply input of the output stage, it is prevented that a voltage can be present at the actuator after the output stage has been deactivated.

The invention also relates to the use of a hydraulic valve control circuit according to the invention for purposes of actuating a hydraulic valve with an actuator that comprises a coil to generate a magnetic field.

The invention also relates to a method to check the function of a hydraulic valve control circuit in which firstly, a hydraulic valve control circuit has an error output. This error output is provided to display an error if the measuring circuit measures a potential at the output that differs from the fixed potential by more than a prescribed threshold value.

Moreover, the method comprises a step to measure the voltage at the output of the output stage and to output an error if the measured potential differs from the fixed potential by more than a prescribed threshold value. In this manner, a superordinated system or a user is informed that an error has occurred in the output stage.

Preferably, the hydraulic valve control device is a device that has a second measuring circuit to measure the voltage at the first voltage supply input of the output stage. Here, the method additionally comprises a step of measuring the voltage at the first voltage supply input of the output stage.

This additional step checks whether the overcurrent protective device has disconnected the output stage from its external voltage supply. It is possible that the overcurrent protective device has already disconnected the output stage from its voltage supply before the error can be measured at the output of the output stage. In this manner, on the basis of the measurement in the second measuring circuit, an error can be output to the superordinated system in this case as well.

BRIEF DESCRIPTION OF THE DRAWINGS

An embodiment of the invention will be explained in greater detail below making reference to the FIGURE.

FIG. 1 shows the schematic structure of a hydraulic valve control device according to the invention.

DETAILED DESCRIPTION

FIG. 1 shows the schematic structure of a hydraulic valve control device 1 according to the invention, with a hydraulic cylinder 25. Inside the hydraulic valve control device 1, there is hydraulic valve control circuit having a first output stage 20, a second output stage 21, an output stage actuating device 22, a measuring circuit 23 and a cutout 40. Moreover, the hydraulic valve 24 and a cutout 40 are located inside the hydraulic valve control device 1. A hydraulic cylinder 25 is provided outside of the hydraulic valve control device 1.

The hydraulic valve 24 drives the hydraulic cylinder 25 of a driven machine. The hydraulic valve 24 is configured as a proportional valve in which a magnetic field is generated by means of coils 241 and 242. The hydraulic valve 24 receives the hydraulic fluid from the pump connection 42 that is linked to a pump. This pump provides the hydraulic fluid at the desired pressure.

The magnetic fields generated by the coils 241 and 242 move a control spool as a function of the current passing through the coils 241 and 242. In other embodiments, which are not shown here, different actuators driven by electric current are employed instead of the coils.

The output stages 20 and 21 each have a control input I, two outputs O1 and O2, a first voltage supply input 2 and a second voltage supply input 3. Furthermore, the output stages 20 and 21 each have an output O that is connected to the output stage actuating device 22. An analog current value is output at this output O in order to allow current regulation. The hydraulic valve control device 1 also has a voltage supply input 8, a second voltage source input (not shown in the FIGURE) for the ground, an enable input ENA, an error output FA, a first switch 31, a second switch 32, a third switch 33 and a fourth switch 34. The switches 31, 32, 33 and 34 are configured as semiconductor switches, for example, as power MOSFETs.

The nodes that are connected to the second voltage supply input of the hydraulic valve control device 1 are designated as the ground 36.

An external voltage source that provides a direct voltage with a rated voltage of 24 V is connected to the first voltage supply input 8 of the hydraulic valve 1. The first terminal of the cutout 40 is connected to the first voltage supply input 8 of the hydraulic valve 1, while its second terminal is connected to the first voltage supply input 2 of the first output stage 20 and to the first voltage supply input 2 of the second output stage 21. The second voltage supply input 3 of the output stages 20 and 21 are each connected to the ground 36.

A system that is superordinated to the hydraulic valve control device 1 applies a level to the enable input ENA and this level determines whether the output stages 20 and 21 allow current to flow through the solenoids 241 and 242 of the hydraulic valve 24 or whether the output stages 20 and 21 switch their outputs O1 and O2 high-ohmically.

In the case of a high level at the enable input ENA, the output stages 20 and 21 are isolated and the additional switches 31, 32, 33 and 34 are opened. If a high level is applied to the enable input ENA of the hydraulic valve control device 1, this level is received by the output stage actuating device 22. This output stage actuating device 22 emits a pulse-width-modulated signal that the output stages 20 and 21 receive at their control inputs I. The output stages 20 and 21 actuate their outputs O1 and O2 in such a way that a current flows through the coils 241 and 242. This current flows from the first voltage supply input through a driver in the output stage 20 or 21 via the output O1, the coil 241 of the hydraulic valve 24 to the output O2, through another driver in the output stage 20 or 22 and from there, to the second voltage supply input 3 that is connected to the ground 36.

In a common embodiment, the output stages 20 and 21 each contain full bridges. Embodiments with high-side and low-side switches or with half bridges are also possible. The output stage actuating device 22 regulates the position of the hydraulic valve 24, whereby it receives information about the position of the control spool of the hydraulic valve 24 via a feedback path 26.

The output stages 20 and 21 are preferably controlled by means of a microcontroller in the output stage actuating device 22. In this embodiment, this microcontroller also takes over the actual current regulation of the output stages 20 and 21.

The node that is connected to the output O2 of the first output stage 20 is designated as K1, the node at the output O1 of the first output stage 20 is designated as K2, the outputs O1 and O2 of the second output stage 21 are connected to the nodes K4 and K3, respectively. The first switch 31 is provided between the nodes K1 and the ground 36, the second switch 32 between the nodes K2 and the ground 36, the third switch is located in the path between the node K3 and the ground 36, and the fourth switch 34 is provided between the nodes K4 and the ground 36. The switching inputs of the switches 31, 32, 33 and 34 are each connected to the enable input ENA. If the output stages 20 and 21 are blocked when a low level is applied to the enable input ENA, then the switches 31, 32, 33 and 34 are all closed, so that, by means of these switches, connections are closed between the nodes K1, K2, K3 and K4 on one side, and to the ground 36 on the other side.

If the output stages 20 and 21 have been switched high-ohmically when their outputs O1 and O2 were deactivated, then the nodes K1, K2, K3 and K4 are each connected to the ground potential.

The voltages at the nodes K1, K2, K3 and K4 are tapped and fed to the measuring circuit 23. If the enable input is at the low level, the voltages are measured at the nodes K1, K2, K3 and K4. If all of them are below a certain threshold value, for example, 0.1 V, then it is ensured that no more currents flow through the coils 241 and 242.

If, in contrast, the voltage at least one of the nodes K1, K2, K3 and K4 is higher than the threshold value, then the measuring circuit 23 outputs an error at the error output FA. In this case, it can be assumed that, between the first voltage supply input 2 and one of the outputs O1 and O2, the driver is actively driving its output O1 or O2. This means that the deactivation of the output stages 20 and 21 has not functioned via the output stage actuating device 22.

The cutout 40 is provided as an additional safety measure. If the output stages 20 or 21 have not been successfully deactivated in spite of the low level at the enable output ENA, then a high current flows from the first voltage supply input 8 of the hydraulic valve control device 1 through the cutout 40, through one of the output stages 20 and 21, to one of the nodes K1, K2, K3 and K4 through one of the switches 31, 32, 33 and 34 to the ground 36. The high current causes the cutout 40 to interrupt this connection. If the cutout 40 is an electric cutout, also called a fusible cutout, it melts at this high current, thus interrupting the connection between the first voltage supply input 8 of the hydraulic valve 1 and the first voltage supply inputs 2 of the first output stage 20 and of the second output stage 21. The fusible cutout then has to be replaced.

Another embodiment is a power circuit breaker in which the current is measured. If the current exceeds a prescribed threshold value, the switch is opened without this permanently damaging the cutout 40.

The cutout 40 should be designed in such a way that the drivers in the output stages 20 and 21 and the semiconductor switches 31, 32, 33 and 34 are protected against the short-circuit current that is to be expected.

In another embodiment, the potential is measured at the first voltage supply inputs 2 of the output stages 20 and 21. If this potential is close to the ground potential, it can be concluded that the cutout 40 has melted or that its switch has opened. This is output by means of an error signal to the superordinated system or to a user. In one embodiment, the measuring circuit 23 is also employed to cyclically test the switches 31 to 34.

| List of reference numerals | |
|---|---|
| 1 | hydraulic valve control device |
| 2 | first voltage supply input |
| 3 | second voltage supply input |
| 8 | third voltage supply input |
| 10 | DC-DC voltage converter |
| 20 | first output stage |
| 21 | second output stage |
| 22 | output stage actuating device |
| 23 | measuring circuit |
| 24 | hydraulic valve |
| 25 | hydraulic cylinder |
| 26 | feedback path |
| 31 | first switch |
| 32 | second switch |
| 33 | third switch |
| 34 | fourth switch |
| 40 | cutout |
| 241 | coil |
| 242 | coil |
| 42 | pump connection |

What is claimed is:

1. A hydraulic valve control circuit of a hydraulic valve comprising:
   an external voltage supply;
   an output stage having a voltage supply input and at least one output configured to actuate an actuator of the hydraulic valve;
   an overcurrent protective device disposed in a path between the external voltage supply and the voltage supply input;
   an enable input configured to activate and deactivate the output stage; and
   a switch controlled by the enable input and configured to connect the at least one output to a fixed potential when the output stage is deactivated so as to provide a short circuit path with respect to the actuator of the hydraulic valve between the at least one output and the fixed potential.

2. The hydraulic control circuit as recited in claim 1, wherein the overcurrent protective device includes a fusible cutout.

3. The hydraulic valve control circuit as recited in claim 1, wherein the overcurrent protective device includes a circuit breaker.

4. The hydraulic valve control circuit as recited in claim 1, further comprising a measuring circuit configured to measure a voltage at an output of the output stage.

5. The hydraulic valve control circuit as recited in claim 4, further comprising an error output indicating an error if the measuring circuit measures a potential at the output differing from the fixed potential by more than a prescribed threshold value.

6. The hydraulic valve control circuit as recited in claim 1, further comprising a second measuring circuit configured to measure a voltage at the first voltage supply input of the output stage.

7. The hydraulic valve control circuit as recited in claim 1, wherein the fixed potential is a ground potential.

8. The hydraulic valve control circuit as recited in claim 1, wherein the fixed potential is equal to the earth potential.

9. The hydraulic valve circuit as recited in claim 1, wherein the actuator actuating the hydraulic valve comprises a coil to generate a magnetic field.

10. A method to check the function of a hydraulic valve control circuit of a hydraulic control valve comprising:
    providing an external voltage supply;
    actuating an actuator of the hydraulic control valve using an output stage having a voltage supply input and at least one output;
    disposing an overcurrent protective device in a path between the external voltage supply and the voltage supply input;
    activating and deactivating the output stage using an enable input;
    connecting the at least one output to a fixed potential using a switch controlled by the enable input when the output stage is deactivated so as to provide a short circuit path with respect to the actuator of the hydraulic valve between the at least one output and the fixed potential;
    measuring a voltage at an output of the output stage using a measuring circuit; and
    indicating an error using an error output if the potential at the output differs from the fixed potential by more than a prescribed value.

11. The method as recited in claim 10, further comprising measuring a voltage at the first voltage supply input of the output stage using a second measuring circuit.

12. The method as recited in claim 10, further comprising testing functioning of the switch.

\* \* \* \* \*